United States Patent [19]
Takishima et al.

[11] Patent Number: 5,337,300
[45] Date of Patent: Aug. 9, 1994

[54] SIGNAL SENSING DEVICE OF MAGNETO-OPTIC DISK DEVICE FOR DETECTING ERROR SIGNAL AND INFORMATION RECORD SIGNALS WITH COMMON PHOTO SENSOR

[75] Inventors: Suguru Takishima; Toshiyuki Kase, both of Tokyo, Japan

[73] Assignee: Asahi Kogaku Kogyo Kabushiki Kaisha, Tokyo, Japan

[21] Appl. No.: 818,534

[22] Filed: Jan. 9, 1992

[30] Foreign Application Priority Data

Jan. 11, 1991 [JP] Japan .................................. 3-069595
Oct. 30, 1991 [JP] Japan .................................. 3-284703

[51] Int. Cl.5 .................................................. G11B 7/00
[52] U.S. Cl. ........................... 369/44.41; 369/110; 369/112
[58] Field of Search ............... 369/110, 44.37, 44.38, 369/112, 44.41, 44.42, 111; 385/280, 281, 283

[56] References Cited

U.S. PATENT DOCUMENTS

| | | | |
|---|---|---|---|
| 4,773,053 | 9/1988 | Gottfried | 369/110 |
| 4,926,409 | 5/1990 | Tsuyuguchi et al. | 369/112 |
| 5,033,828 | 7/1991 | Haruta | 369/110 |
| 5,070,493 | 12/1991 | Marshall et al. | 369/112 |
| 5,150,350 | 9/1992 | Aikoh et al. | 369/44.38 |

FOREIGN PATENT DOCUMENTS

| | | | |
|---|---|---|---|
| 60-234253 | 11/1985 | Japan | 369/110 |
| 63-247938 | 10/1988 | Japan | 369/110 |
| 02148428 | 6/1990 | Japan | 369/110 |
| 02193344 | 7/1990 | Japan | 369/110 |
| 02240849 | 9/1990 | Japan | 369/110 |
| 02276046 | 11/1990 | Japan | 369/110 |

*Primary Examiner*—Aristotelis Psitos
*Assistant Examiner*—P. W. Huber
*Attorney, Agent, or Firm*—Sandler, Greenblum & Bernstein

[57] ABSTRACT

A signal sensing device is provided that includes an optical system having a first splitting function by which a beam reflected by a magneto-optic disk is split by a small amount, a second splitting function by which the beam is split into a P-polarized-component and an S-polarized-component, and a third splitting function by which the beam is split into a first optical path and a second optical path. The second splitting function is carried out by an optical element carrying out one of the first and third splitting functions. A first photo sensor is provided with a beam receiving area divided into four parts, and an undivided beam receiving area, and a second photo sensor is provided with a beam receiving area divided into two parts and an undivided beam receiving area. The beam receiving divided area of the first photo sensor receives the P-polarized-component and senses a focusing error signal, and the beam receiving divided area of the second photo sensor receives the S-polarized-component and senses a tracking error signal. The beam receiving undivided areas of the first and second photo sensors are provided for sensing an information record signal.

22 Claims, 11 Drawing Sheets

SIGNAL SENSING DEVICE OF MAGNETO-OPTIC DISK DEVICE FOR DETECTING ERROR SIGNAL AND INFORMATION RECORD SIGNALS WITH COMMON PHOTO SENSOR

BACKGROUND OF THE INVENTION

1. Field of the Invention

The present invention relates to a signal sensing device for a magneto-optic disk device, and more particularly, to a signal sensing device for sensing a tracking error signal, a focusing error signal and an information record signal in accordance with a beam reflected onto a magneto-optic disk.

2. Description of the Related Art

In an optical system of a conventional signal sensing device, a laser beam outputted from a semiconductor laser device passes through two half-mirror planes in a compound prism and is reflected onto a magneto-optic disk. A part of the beam reflected onto the magneto-optic disk is reflected by one of the half-mirror planes onto an error sensor provided for obtaining a focusing error signal and a tracking error signal. The other part of the beam is reflected by the other of the half-mirror planes and is split by a polarized beam splitter. The split beams are reflected onto data sensors provided for obtaining an information record signal recorded in the magneto-optic disk.

In the magneto-optical disk device, three kind of signals, i.e., the focusing error signal, the tracking error signal and the information record signal, must be obtained from a laser beam reflected onto the magneto-optic disk. Therefore, in the conventional device described above, one sensor is provided for sensing the error signals, and two sensors are provided for sensing the information record signal. When a sensor is provided only for sensing the error signals, however, the number of photo sensors is increased, and thus the optical system becomes complicated.

SUMMARY OF THE INVENTION

Therefore, an object of the present invention is to provide a signal sensing device by which the error signals and the information record signal are sensed by a common photo sensor, and thus the number of photo sensors is reduced and the optical system is simplified.

According to the present invention, there is provided a signal sensing device comprising a beam splitting mechanism, a first photo sensor, and a second photo sensor.

The beam splitting mechanism splits a beam reflected from a magneto-optic disk. The beam splitting mechanism has a splitting function in which the reflected beam is split by a small amount, a first splitting function in which the reflected beam is split into a P-polarized-component and an S-polarized-component, and a second splitting function in which the reflected beam is split into a first optical path and a second optical path. The first photo sensor is provided with a beam receiving divided area and a beam receiving undivided area. The beam receiving divided area is provided for receiving the P-polarized-component directed in the first optical path to thereby sense an error signal, and the beam receiving undivided area is provided for receiving the S-polarized-component directed in the first optical path. The second photo sensor is provided with a beam receiving undivided area for receiving the P-polarized-component directed in the second optical path.

Further, according to the present invention, there is provided a signal sensing device comprising a beam splitting mechanism, a first photo sensor, and a second photo sensor.

The beam splitting mechanism splits a beam reflected from a magneto-optic disk. The splitting mechanism has a splitting function in which the reflected beam is split by a small amount, a first splitting function in which the reflected beam is split into a P-polarized-component and an S-polarized-component, and a second splitting function in which the reflected beam is split into a first optical path and a first optical path. The second splitting function is carried out by an optical element provided for carrying out one of the splitting function by a small amount and second splitting functions, whereby four laser beams composed of the first laser beam split by the small amount and directed in the first optical path and second laser beam split by the small amount and directed in the second optical path are formed. The first photo sensor is provided with a beam receiving divided area and a beam receiving undivided area. The beam receiving divided area is provided for receiving the P-polarized-component directed in the first optical path to thereby sense an error signal, and the beam receiving undivided area is provided for receiving the S-polarized-component directed in the first optical path. The second photo sensor is provided with a beam receiving undivided area for receiving the P-polarized-component directed in the second optical path.

Furthermore, according to the present invention, there is provided a signal sensing device comprising a first beam splitting mechanism, a second beam splitting mechanism, a first photo sensor, and a second photo sensor.

The first beam splitting mechanism splits a beam reflected from a magneto-optic disk into a P-polarized-component and an S-polarized-component separated by a small amount. The second beam splitting mechanism splits the P-polarized-component and the S-polarized-component into laser beams directed in a first optical path and a second optical path, respectively. The first photo sensor is provided with a beam receiving divided area and a beam receiving undivided area. The beam receiving divided area is provided for receiving the P-polarized-component directed in the first optical path to thereby sense an error signal, and the beam receiving undivided area is provided for receiving the S-polarized-component directed in the first optical path. The second photo sensor is provided with a beam receiving undivided area for receiving the P-polarized-component directed in the second optical path.

Further, according to the present invention, there is provided a signal sensing device comprising a first beam splitting mechanism, a second beam splitting mechanism, a first photo sensor, and a second photo sensor.

The first beam splitting mechanism splits a beam reflected from a magneto-optic disk into a P-polarized-component and an S-polarized-component directed in a first optical path and a second optical path, respectively. The second beam splitting mechanism splits the P-polarized-component into two laser beams separated by a small amount, and splits the S-polarized-component into two laser beams separated by a small amount. the first photo sensor is provided with a beam receiving divided area and a beam receiving undivided area. The beam receiving divided area is provided for receiving the P-polarized-component directed in the first optical path to thereby sense an error signal, and the beam receiving undivided area is provided for receiving the S-polarized-component directed in the first optical path. The second photo sensor is provided with a beam receiving undivided area for receiving the P-polarized-component directed in the second optical path.

Furthermore, according to the present invention, there is provided a signal sensing device comprising a splitting mechanism, a first photo sensor, and a second photo sensor.

The splitting mechanism splits a beam reflected from a magneto-optic disk. The splitting mechanism has a splitting function by which the reflected beam is split by a small amount, a first splitting function by which the reflected beam is split into a P-polarized-component and an S-polarized-component, and a second splitting function by which the reflected beam is split by a large amount. The first photo sensor has a beam receiving divided area and a beam receiving undivided area. The beam receiving divided area is provided for receiving one of the P-polarized-component and the S-polarized-component which is split by the large amount, to thereby sense an error signal. The beam receiving undivided area is provided for receiving the other of the P-polarized-component and the S-polarized-component which is split by the large amount. The second photo sensor has a beam receiving undivided area provided for receiving the one of the P-polarized-component and the S-polarized-component which is split by the large amount.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

The present invention will now be described with reference to embodiments shown in the drawings.

Figures 1A, 1B:
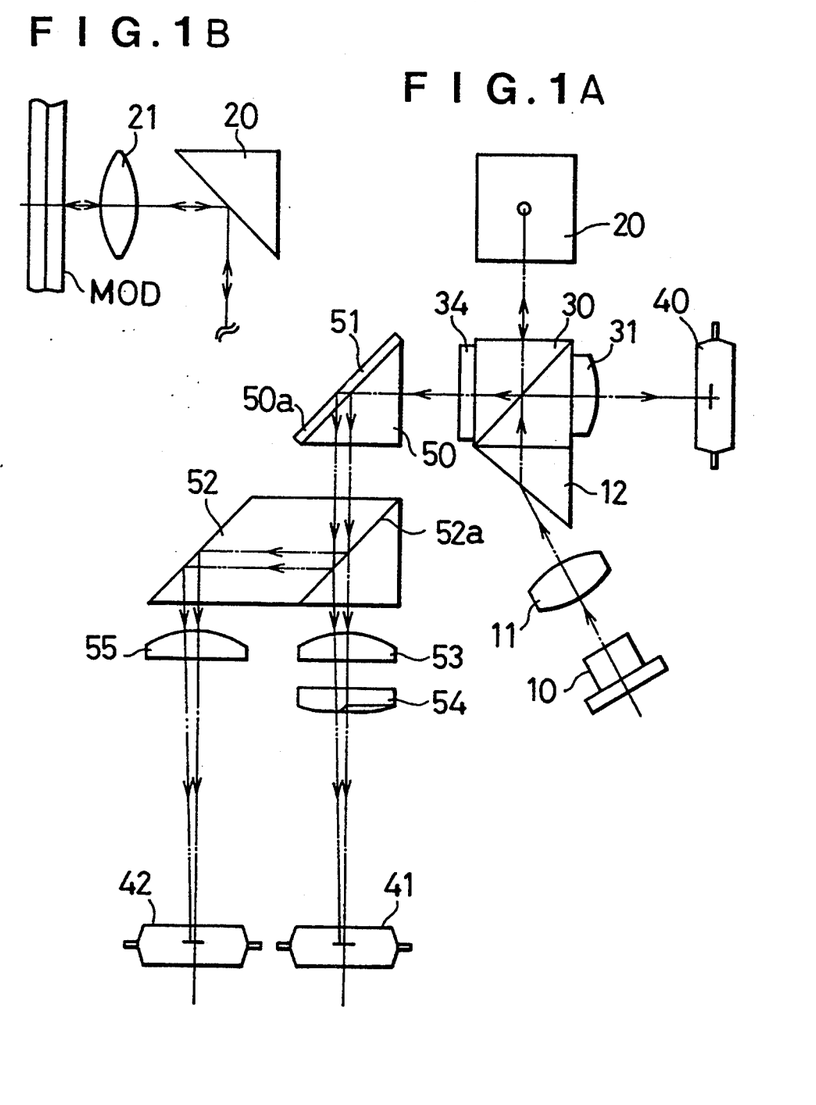
FIG. 1A is a plane view showing an optical system of a first embodiment according to the present invention.
FIG. 1B is a side view showing an objective lens and a magneto-optic disk provided in the optical system shown in FIG. 1A.

FIGS. 1A and 1B show an optical system of a magneto-optical disk device of a first embodiment according to the present invention.

As shown in FIG. 1A, a divergent laser beam outputted from a semiconductor laser device 10 is changed to a parallel laser beam by a collimator lens 11. The sectional shape of the parallel laser beam is shaped by a shaping prism 12 to form a circle, and then the laser beam enters a half-mirror prism 30. A part of the laser beam entering the half-mirror prism 30 is reflected by this prism 30, and is condensed by a condenser lens 31 onto a photo sensor 40 provided for automatically adjusting an output of the semiconductor laser device 10. The laser beam passing through the half-mirror prism 30 is reflected by a mirror 20 in a direction vertical to a paper surface of FIG. 1A, and converged onto a magneto-optic disk (MOD) through an objective lens 21, as shown in FIG. 1B. The objective lens 21 and the mirror 20 are disposed in a head (not shown) that is slidably movable, radially over the MOD. The objective lens 21 is disposed on an actuator provided in the head and moved in the direction of the optical axis of the objective lens 21.

The laser beam reflected onto the MOD again enters the half-mirror prism 30, and is reflected by the half-mirror prism 30. A polarizing direction of the laser beam reflected by the prism 30 is rotated by 45 degrees by λ/2 plate 34, and enters a polarized light splitting prism 50. A multi-layer film for polarizing and splitting of the laser beam is coated on an inclined surface 50a of the polarized light splitting prism 50, and a wedge prism 51 is adhered to the inclined surface 50a. Note, the multi-layer film for polarizing and splitting of the laser beam may be coated on an surface of the wedge prism 51 to which the polarized light splitting prism 50 is adhered.

A P-polarized-component of the laser beam entering the polarized light splitting prism 50 is passed through the inclined surface 50a and reflected onto a reflecting plane of the wedge prism 51, as shown by a double-dashed chain line, and an S-polarized-component of the laser beam entering the polarized light splitting prism 50 is reflected by the inclined surface 50a as shown by a single-dashed chain line. The P-polarized-component and S-polarized-component are outputted from the polarized light splitting prism 50 with an angle difference therebetween that coincides with an apical angle of the wedge prism 51, and enter a prism block 52 having a half-mirror plane 52a. Note, the reflectances of the S-polarized-component and P-polarized-component by the half-mirror plane 52a are 50%, respectively. Further note, although the reflecting plane of the wedge prism 51 is inclined with a small angle relative to the film, this reflecting plane may be parallel to the film, in other words, the wedge prism can be replaced with a parallel plane plate as described later with reference to FIG. 12.

The laser beam passed through the half-mirror plane 52a is converged onto a first photo sensor 41 through a condenser lens 53 and a cylindrical lens 54, and the laser beam reflected by the half-mirror plane 52a is converged onto a second photo sensor 42 through a condenser lens 55.

In the first embodiment, the beam reflected from the MOD is split by the wedge prism 51 and the prism block 52. The wedge prism 51 has a beam splitting function by which the reflected beam is split by a small angular amount. The multi-layer film coated on the inclined surface 50a has a first beam splitting function in which the reflected beam is split into the P-polarized-component and the S-polarized-component. The prism block 52 has a second beam splitting function by which the reflected beam is split into a first direction and a second direction, i.e., a first optical path and a second optical path.

Figure 2A:
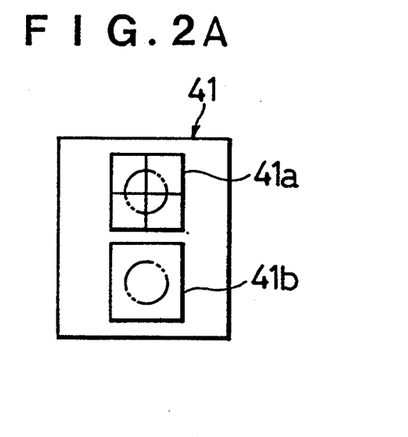
FIG. 2A is a schematic view of a first photo sensor, and shows a relationship between the photo sensor and a beam spot.
Figure 2B:
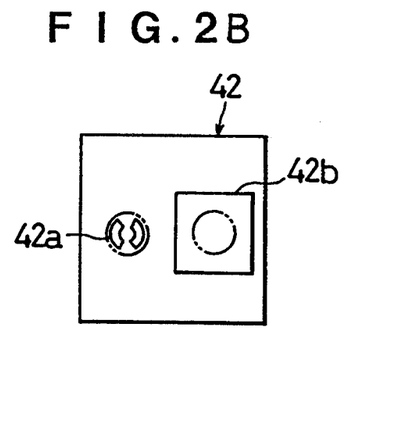
FIG. 2B is a schematic view of a second photo sensor, and shows a relationship between the photo sensor and a beam spot.

FIGS. 2A and 2B show a positional relationship between beam receiving areas of each of photo sensors 41 and 42 and beam spots (shown by a double-dashed chain line in the drawings) converged onto these areas. The first photo sensor 41 is provided with a beam receiving area 41a divided into four parts, and an undivided beam receiving area 41b. The beam receiving area 41a is provided for receiving the P-polarized-component and sensing a focusing error signal, and the beam receiving area 41b is provided for receiving the S-polarized-component and sensing an information record signal. The second photo sensor 42 is provided with a beam receiving area 42a divided into two parts, and an undivided beam receiving area 42b. The beam receiving area 42a is provided for receiving the S-polarized-component and sensing a tracking error signal, and the beam receiving area 42b is provided for receiving the P-polarized-component and sensing an information record signal.

In the first photo sensor 41, the beam receiving area 41a for sensing the focusing error signal is a square-shaped area divided into four beam receiving parts A, B, C and D by lines perpendicular to and crossing each other at the center of the square-shaped beam receiving area 41a. In the second photo sensor 42, the beam receiving area 42a for sensing the tracking error signal has two beam receiving parts E and F disposed at symmetrically located positions and receiving mainly a first order diffraction light of the beam spot formed on the beam receiving area 42a. In the first and second photo sensors 41 and 42, the beam receiving areas 41b and 42b for sensing the information record signal are square-shaped beam receiving parts II and G, respectively.

Signals outputted from each of the parts of the first photo sensor 41 are indicated by the references A, B, C, D and II, and signals outputted from each of the parts of the second photo sensor 42 are indicated by the references E, F and G. The focusing error signal FE, the tracking error signal TE, and the information record signal MO are obtained by the following equations, respectively.

$$FE = (A+D) - (B+C) \quad (1)$$

$$TE = E - F \quad (2)$$

$$MO = G - II \quad (3)$$

The disposition of the beam receiving areas of the photo sensors 41 and 42 is described below.

Figure 3A:
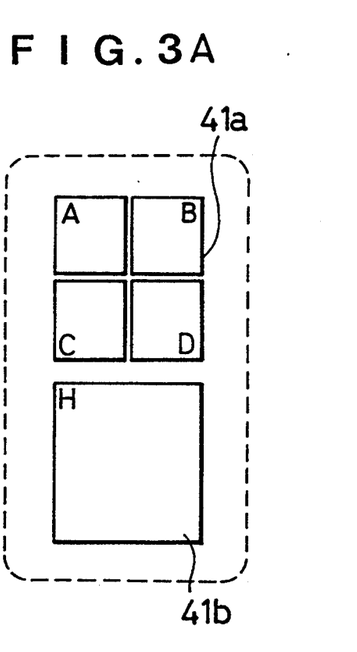
FIG. 3A is a schematic view showing an arrangement of beam receiving areas of the first photo sensor.

When the error signals and the information record signal are sensed by two photo sensors, each of these sensors may have a square-shaped beam receiving area divided into four parts by lines perpendicular to and crossing each other at the center thereof, similar to the beam receiving area 41a shown in FIG. 3A. Namely, the P-polarized-component and the S-polarized-component are received by the beam receiving area, respectively. In this case, the focusing error signal and the tracking error signal can be obtained by the sensor receiving the P-polarized-component or the S-polarized-component. It is assumed that signals outputted from each of the parts of one of the sensors are indicated by the references A, B, C and D, and signals outputted from each of the parts of the other of the sensors are indicated by the references A', B', C' and D'.

The focusing error signal is the difference between the sum of output signals of two beam receiving parts located at diagonally opposing positions in the beam receiving area divided into four parts and the sum of output signals of the other two beam receiving parts located at diagonally opposing positions in the beam receiving area. Namely, the focusing error signal is $(A+D)-(B+C)$, or $(A'+D')-(B'+C')$. The tracking error signal is the difference between the sum of output signals of two beam receiving parts vertically (in the drawing) adjacent to each other on the beam receiving area divided into four parts and the sum of output signals of the other two beam receiving parts vertically (in the drawing) adjacent to each other on the beam receiving area. Namely, the tracking error signal is $(A+C)-(B+D)$, or $(A'+C')-(B'+D')$.

The information record signal is a difference between the sum of output signals of all four parts of one of the sensors and the sum of output signals of all four parts of the other sensor. Namely, the information record signal is $(A+B+C+D)-(A'+B'+C'+D')$.

Figure 3B:
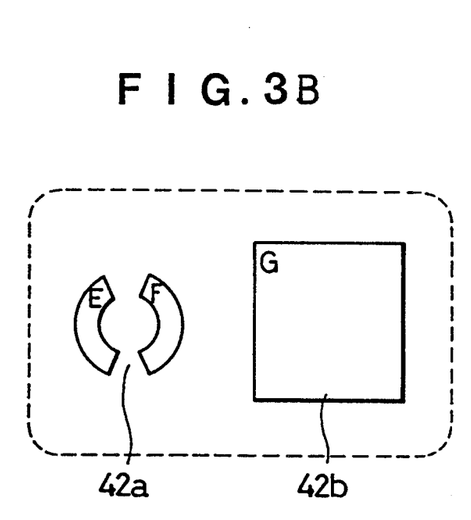
FIG. 3B is a schematic view showing an arrangement of beam receiving areas of the second photo sensor.

Although the photo sensor having the four-divided beam receiving area divided into four parts is able to sense the focusing error signal by the astigmatism method (see equation (1)), the photo sensor is not able to sense the tracking error signal by the push-pull method (see equation (2)), due to, for example, a shift of the beam spot on the photo sensor occurring when the laser beam is offset because of a deformation of the MOD. Therefore, when sensing the tracking error signal, a pattern receiving mainly a first order diffraction light of the beam spot formed on the photo sensor, i.e., a pattern of the beam receiving parts E and F shown in FIG. 3B, is preferable.

Accordingly, if the beam receiving parts E and F for sensing the tracking error signal are provided, in addition to the beam receiving parts A, B, C and D for sensing the focusing error signal, both the tracking error signal and the focusing error signal can be sensed with a high accuracy, but since a space between the parts E and F is a dead zone, a center part of the spot beam at which the energy is highest is useless, and thus a signal level for sensing the information record signal becomes low.

Further, in both cases, since the photo sensor having the beam receiving divided area has a narrower receiving area than the photo sensor having the beam receiving undivided area without a dead zone, the output signals of the photo sensors include a difference therebetween when sensing the information record signal, and therefore, it is difficult to carry out an adjustment needed to obtain an electrical balance of the output signals, i.e., the P-polarized-component and the S-polarized-component.

In the embodiment of the present invention, to solve the above problems, the beam receiving area for sensing the error signals and the beam receiving area for sensing the information record signal are provided separately or independently, and due to this construction, each of the error signals is sensed with a high accuracy. Further, since the information record signal is sensed by two beam receiving undivided areas each having the same shape, no dead zone exists therein, and thus it is easy to obtain an electric balance of the P-polarized-component and the S-polarized-component.

Figures 4A, 4B:
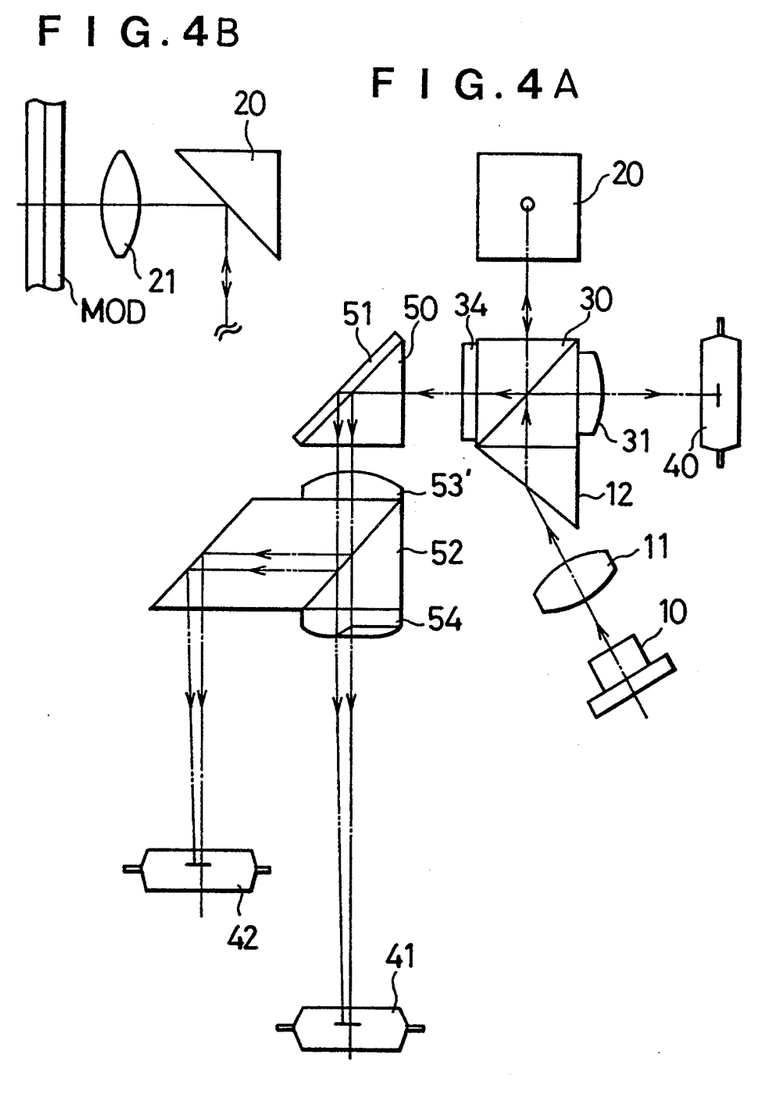
FIG. 4A is a plane view showing an optical system of a second embodiment according to the present invention.
FIG. 4B is a side view showing an objective lens and a magneto-optic disk provided in the optical system shown in FIG. 4A.

FIGS. 4A and 4B show a second embodiment of the present invention. In the first embodiment, the condenser lenses 53 and 55 are provided for the photo sensors 41 and 42, but in the second embodiment, one condenser lens 53' is disposed in front of a position at which the laser beam is split by the prism block 52, i.e., a position at which the laser beam is not split by the prism block 52, and is used for both the error signal sensing system and the information record signal sensing system. Note, the photo sensor 41 is located at a position more to the rear than in the first embodiment, and thus the optical paths from the condensor lens 53' to both of the photo sensors 41 and 42 are the same. The remaining construction is the same as that of the first embodiment shown in FIGS. 1A and 1B.

Figures 5A, 5B:
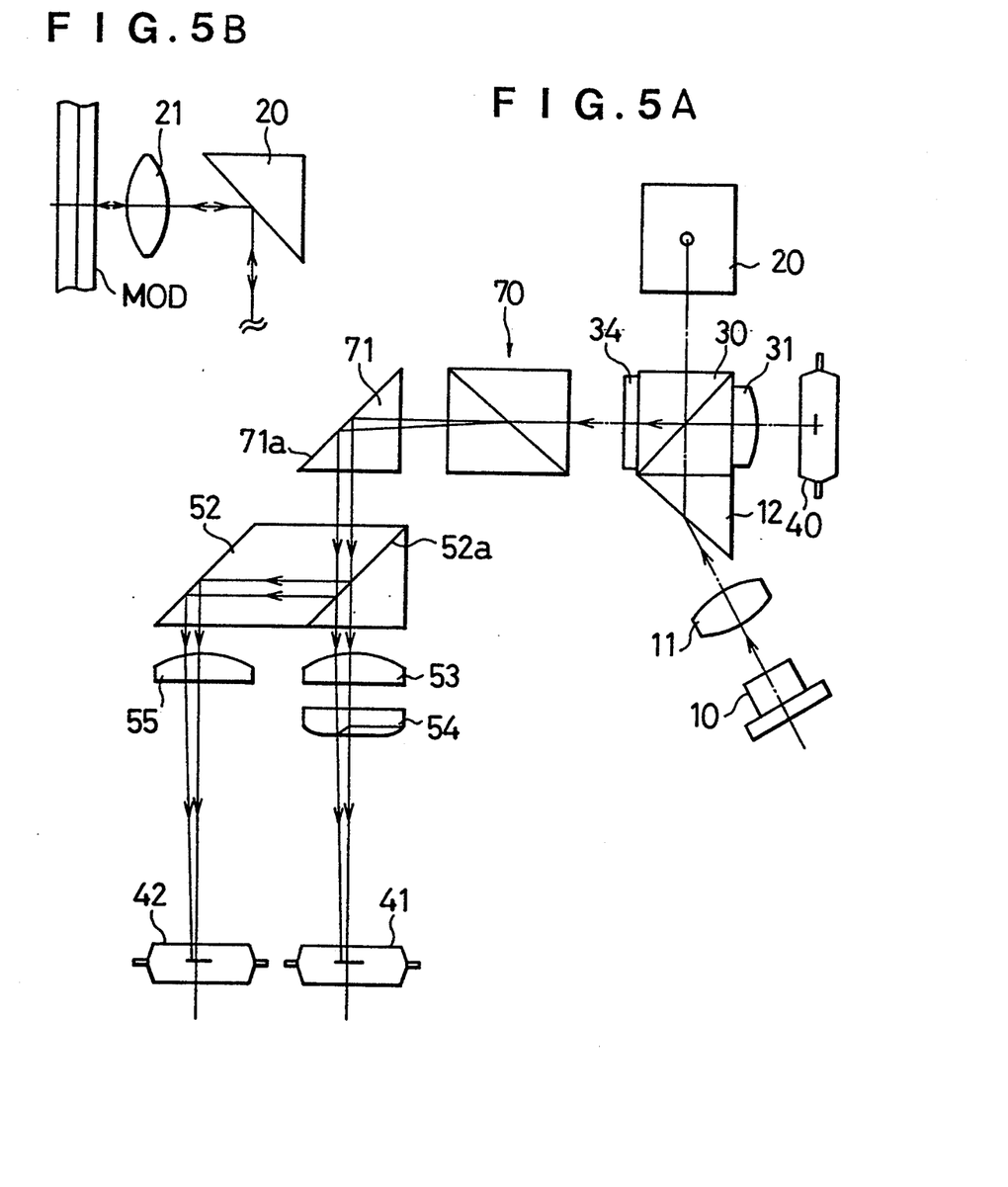
FIG. 5A is a plane view showing an optical system of a third embodiment according to the present invention.
FIG. 5B is a side view showing an objective lens and a magneto-optic disk provided in the optical system shown in FIG. 5A.

FIGS. 5A and 5B show a third embodiment of the present invention.

In this embodiment, instead of the polarized light splitting prism 50 and the wedge prism 51, a Wollaston prism 70 and a total reflection prism 71 are provided. The Wollaston prism 70 splits a beam reflected from a magneto-optical disk into a P-polarized-component and an S-polarized-component, and the total reflection prism 71 reflects the P-polarized-component and the S-polarized-component from the Wollaston prism 70 toward the prism block 52.

Figure 6A:
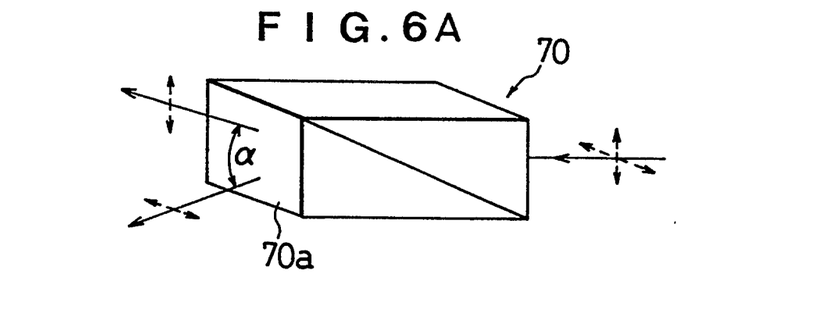
FIG. 6A is a perspective view of a Wollaston prism.
Figure 6B:
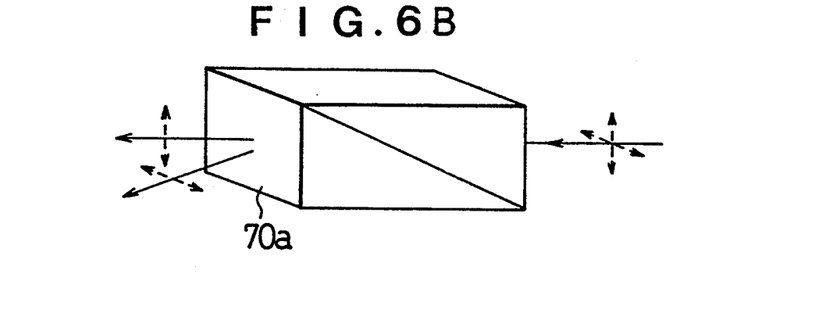
FIG. 6B is a perspective view of a Rochon prism.
Figure 6C:
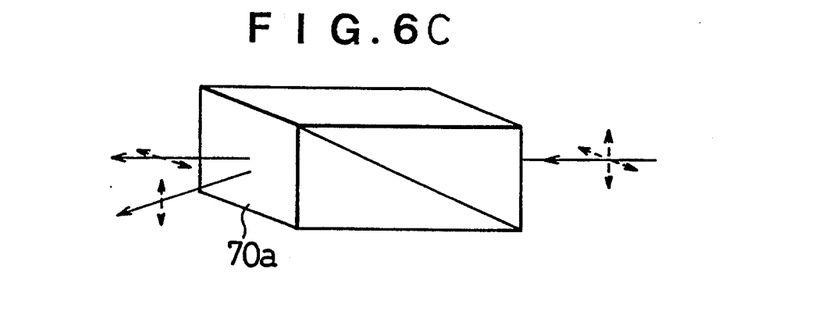
FIG. 6C is a perspective view of a Senarmont prism.
Figure 6D:
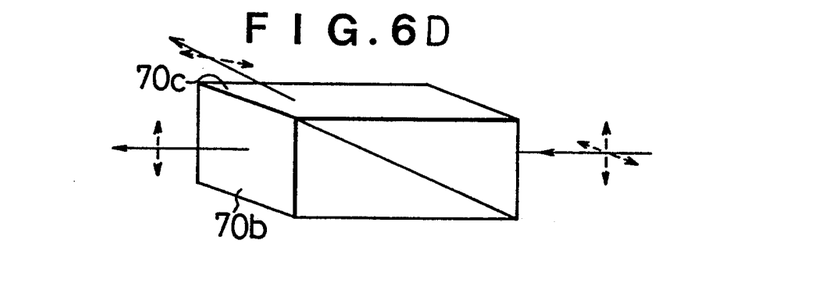
FIG. 6D is a perspective view of a Gramthomson prism.

The Wollaston prism 70 is a crystalline polarizer, and is formed by joining two wedge-shaped rock crystals together as shown in FIG. 6A. The Wollaston prism 70 splits the incident beam into a P-polarized-component and an S-polarized-component, and radiates these components from a radiation surface 70a. At this time, an angle formed by the P-polarized-component and the S-polarized-component radiated from the radiation surface 70a is split angle α. As a crystalline polarizer that can be used instead of this Wollaston prism 70, there are known a Rochon prism, a Senarmont prism and a Gramthomson prism, as shown in FIGS. 6B, 6C and 6D, respectively. In the Rochon prism (FIG. 6B) and the Senarmont prism (FIG. 6C), one of the P-polarized-component and the S-polarized-component is directed in a straight line perpendicular to the radiation surface 70a and radiated therefrom, and the other component is radiated at a predetermined angle relative to the component directed in the straight line perpendicular to the radiation surface 70a. In the Gramthomson prism shown in FIG. 6D, one of the polarized-components is radiated from the radiation surface 70a, and the other polarized-component is radiated from a side surface 70c thereof, and accordingly, the angle of the split between the P-polarized-component and the S-polarized-component is larger than those of the prisms shown in FIGS. 6A, 6B and 6C.

Figures 7A, 7B:
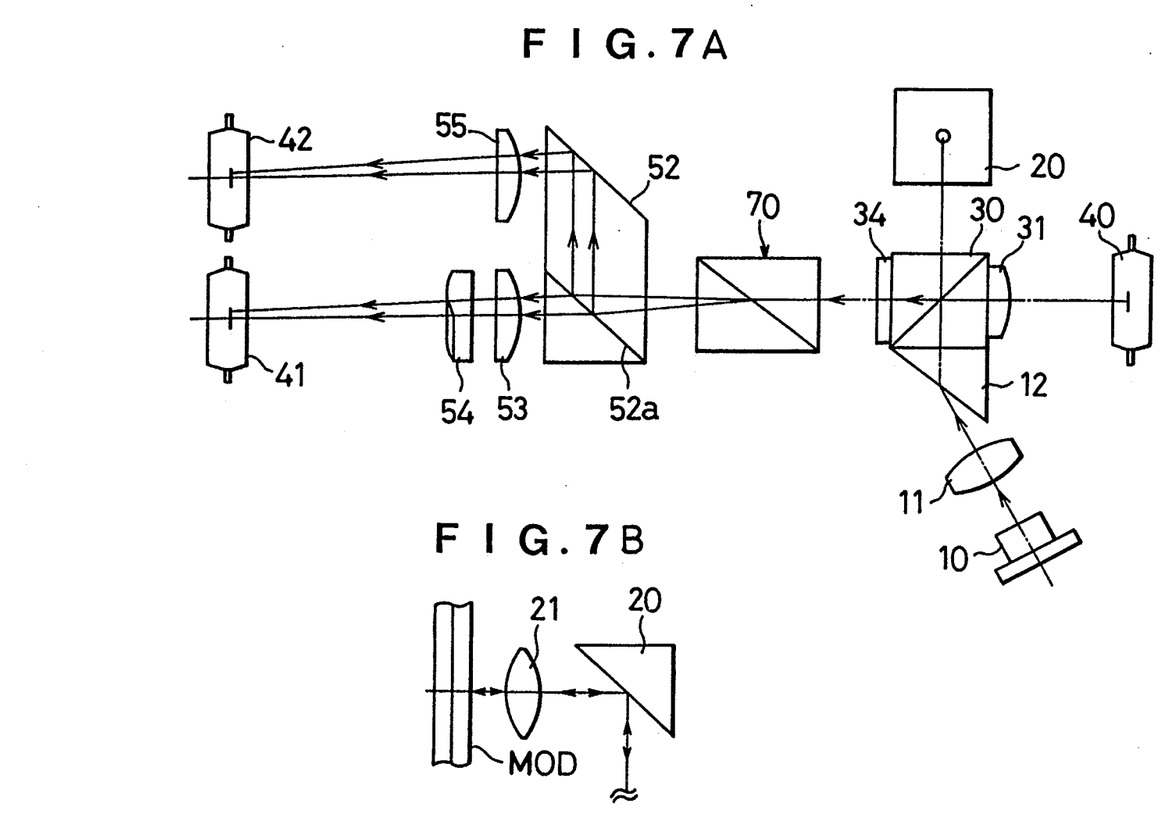
FIG. 7A is a plane view showing an optical system of a fourth embodiment according to the present invention.
FIG. 7B is a side view showing an objective lens and a magneto-optic disk provided in the optical system shown in FIG. 7A.

FIGS. 7A and 7B show a fourth embodiment of the present invention. In this embodiment, the total reflecting prism 71 is omitted from the construction of the third embodiment shown in FIGS. 5A and 5B, and thus the P-polarized-component and the S-polarized-component radiated from the Wollaston prism 70 directly enter the prism block 52, and therefore, this construction is simplified in comparison with that of the third embodiment.

Note, in the optical system shown in FIGS. 4A and 4B, the Wollaston prism 70 and the total reflecting prism 71 can be provided instead of the polarized light splitting prism 50 and the wedge prism 51, as shown in FIGS. 5A and 5B. Further, only the Wollaston prism 70 can be provided instead of the polarized light splitting prism 50 and the wedge prism 51, as shown in FIGS. 7A and 7B.

Figures 8A, 8B:
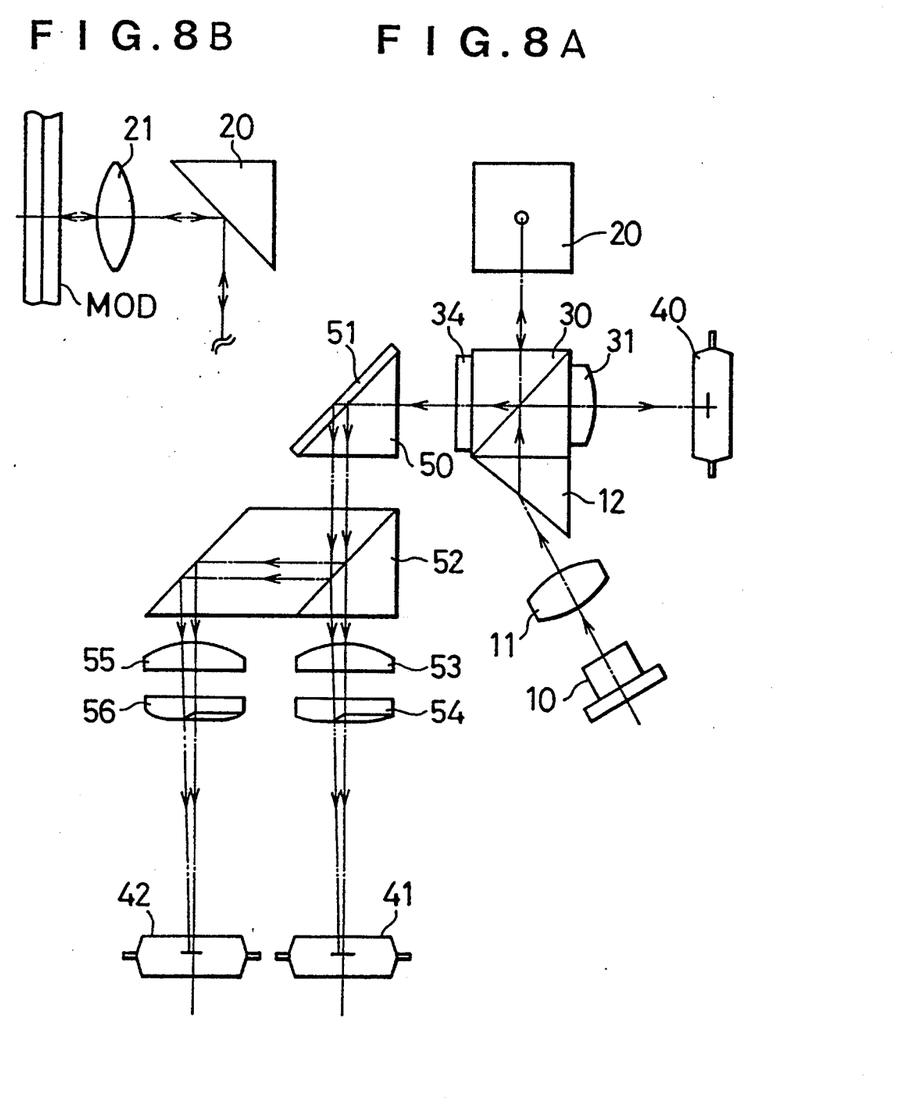
FIG. 8A is a plane view showing an optical system of a fifth embodiment according to the present invention.
FIG. 8B is a side view showing an objective lens and a magneto-optic disk provided in the optical system shown in FIG. 8A.

FIGS. 8A and 8B show a fifth embodiment of the present invention.

In the above embodiments, the focusing error signal and the tracking error signal are sensed separately by the photo sensors, but in the fifth embodiment, the first photo sensor and the second photo sensor are each provided with a beam receiving area having the same pattern as the other, to obtain the error signals. Namely, the focusing error signal and the tracking error signal are sensed by using both of the photo sensors.

The P-polarized-component and the S-polarized-component split by a very small angle by the polarized light splitting prism 50 and the wedge prism 51, are split by the prism block 52 regardless of the polarization thereof. Then, in the split laser beams, a component passing through the prism block 52 is converged onto the first photo sensor 41 through the condenser lens 53 and the cylindrical lens 54, and a component reflected by the prism block 52 is converged onto the second photo sensor 42 through the condenser lens 55 and the cylindrical lens 56. The remaining construction of the optical system is the same as that shown in FIGS. 1A and 1B.

Figure 9:
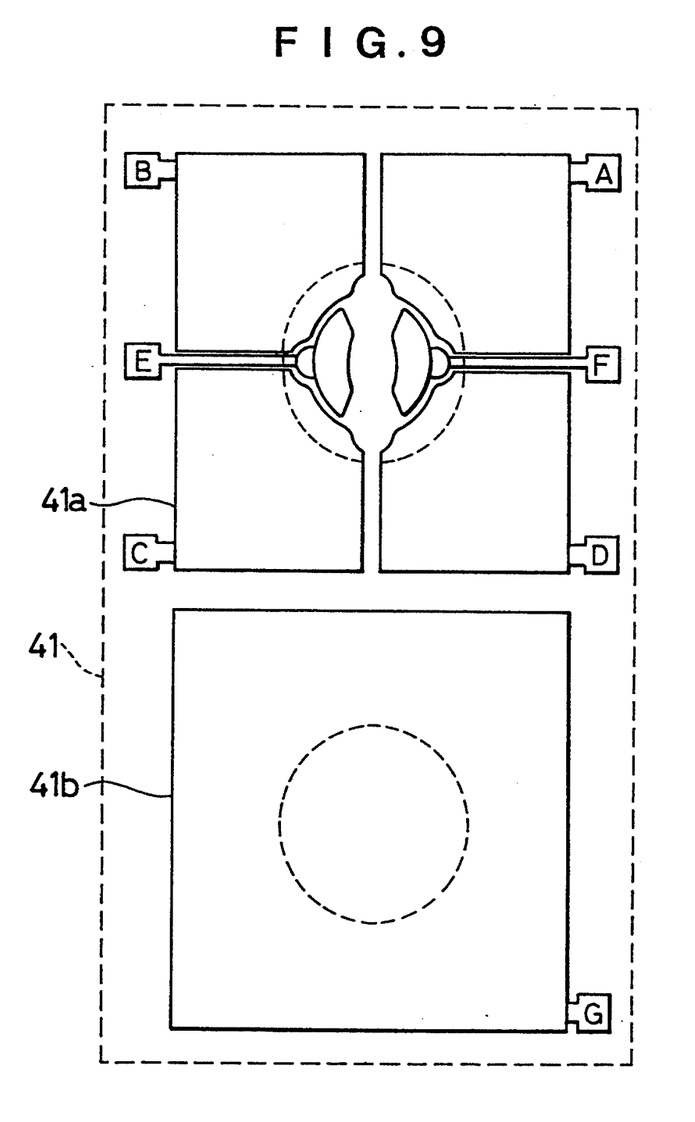
FIG. 9 is a schematic view showing an arrangement of beam receiving areas of a first photo sensor of the fifth embodiment.

The first photo sensor 41 has a beam receiving divided area 41a and a beam receiving undivided area 41b. The beam receiving area 41a is provided for sensing a P-polarized-component to obtain error signals, and is provided with two beam receiving parts E and F for sensing the tracking error signal by the push-pull method (see equation (2)) and four beam receiving parts A, B, C and D for sensing the focusing error signal by the astigmatism method (see equation (1)). The beam receiving parts E and F have symmetrical shapes, respectively, are separated from each other, and are symmetrically located at positions at which mainly a first order diffraction light of the beam spot is received. The beam receiving parts A, B, C and D are located outside the beam receiving parts E and F sensing the tracking error signal. The beam receiving area 41b is provided for sensing an S-polarized-component, to thus obtain the information record signal, and is provided with a beam receiving part 41b.

Conversely, the second photo sensor 42 is provided with a beam receiving divided area for sensing an S-polarized-component, to thus obtain the error signals, and a beam receiving undivided area for sensing a P-polarized-component, to thus obtain the information record signal. Since the arrangement of the beam receiving parts in the beam receiving areas of the second photo sensor 42 is the same as that of the first photo sensor 41, the second photo sensor 42 is not shown in the drawing.

Signals outputted from each of the parts of the first photo sensor 41 are indicated by the references A, B, C, D, E, F and G, and signals outputted from each of the parts of the second photo sensor 42 are indicated by the references A', B', C', D', E', F' and G'. The focusing error signal FE, the tracking error signal TE, and the information record signal MO are obtained by the following equations, respectively.

$$FE = ((A+D) - (B+C)) + ((A'+D') - (B'+C'))$$

$$TE = (E-F) + (E'-F')$$

$$MO = G - G'$$

The amplitudes of the error signals FE and TE are doubled by taking the sum of the outputs of the photo sensors 41 and 42, and thus the accuracy of sensing the signals is made higher. Since the patterns of the beam receiving areas of both the photo sensors are the same as each other, the information record signal MO also can be obtained by the following equation.

$$MO = (A+B+C+D+E+F+G) - (A'+B'+C'+D'+E'+F'+G')$$

According to this calculation, the energy of laser beam led from the magneto-optic disk is effectively utilized.

Figure 10:
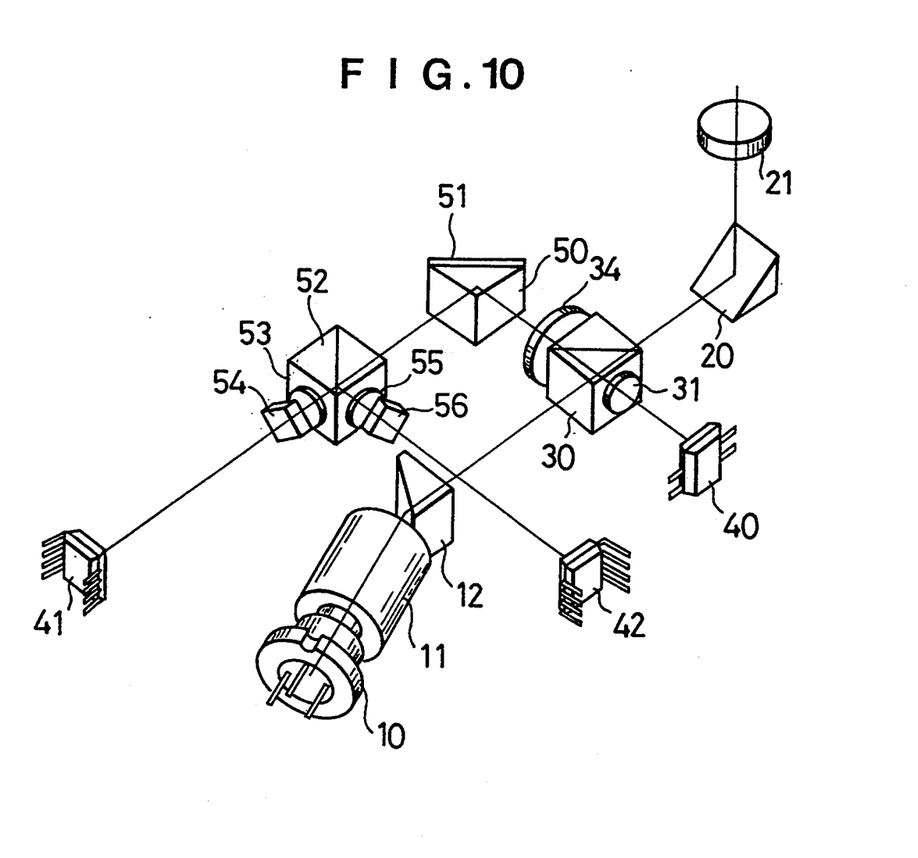
FIG. 10 is a perspective view showing an optical system of a sixth embodiment.

FIG. 10 shows a sixth embodiment of the present invention. In this embodiment, although the optical system is provided with two photo sensors 41 and 42 for sensing the error signals and the information record signal, as in the fifth embodiment shown in FIGS. 8A and 8B, the arrangement therein of the photo sensors 41 and 42 is different from that of the fifth embodiment. Since the photo sensors 41 and 42 are arranged so as to face the same direction in the fifth embodiment, the output signals of the photo sensors 41 and 42 may interfere with each other. Conversely, in the sixth embodiment, the photo sensors 41 and 42 face in different directions from each other, whereby any interference of the output signals of the photo sensors 41 and 42 is prevented. Further, the optical path along which the signals to the photo sensor 42 are directed crosses another optical path along which the signals to the MOD are directed, and thus size of the optical system is made much smaller. The remaining construction is the same as that of the fifth embodiment.

Figures 11A, 11B:
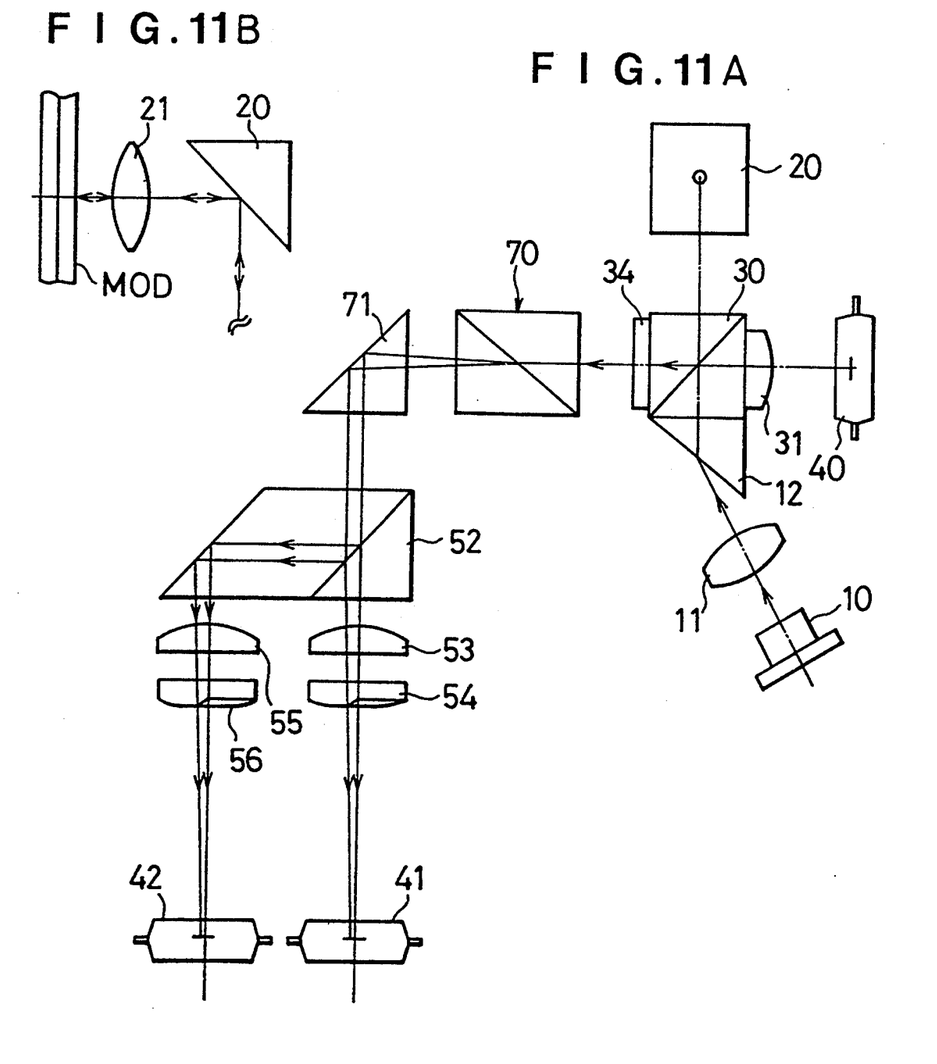
FIG. 11A is a plane view showing an optical system of a seventh embodiment according to the present invention.
FIG. 11B is a side view showing an objective lens and a magneto-optic disk provided in the optical system shown in FIG. 11A.

FIGS. 11A and 11B show a seventh embodiment of the present invention.

In this seventh embodiment, instead of the polarized light splitting prism 50 and the wedge prism 51 used in the fifth embodiment, a Wollaston prism 70 and a total reflection prism 71 are provided, for splitting a beam reflected from a MOD into a P-polarized-component and an S-polarized-component, separated by a small amount.

This construction is the same as that of the third embodiment shown in FIGS. 5A and 5B. Further, in the seventh embodiment, by removing the total reflection prism 71, similar to the fourth embodiment shown in FIGS. 7A and 7B, the P-polarized-component and the S-polarized-component outputted from the Wollaston prism 70 can directly enter the prism block 52.

This construction also can be applied to the sixth embodiment shown in FIG. 10. Namely, instead of the polarized light splitting prism 50 and the wedge prism 51 of FIG. 10, the Wollaston prism 70 and the total reflection prism 71 can be provided, or only the Wollaston prism 70 provided.

In the present invention, a step in which a beam is split into a P-polarized-component and an S-polarized-component, and a step in which each of the polarized-components is split into two components directed in different directions from each other, are required, and although these steps are carried out at the same time in the embodiments described above, these steps can be carried out by separate means.

For example, in FIGS. 1A and 1B, the reflecting plane 50a of the wedge prism 51 is formed as a non-polarization half-mirror plane, and the reflecting plane 52a of the prism block 52 is formed as a polarization splitting plane. In this case, a part of beam passing through the reflecting plane 50a and reflected onto a back surface of the wedge prism 51 is also reflected onto the reflecting plane 52a. Taking into consideration a loss of the amount of light due to this reflection, to equalize the amount of beam split by a small amount, the reflectances of the S-polarized-component and P-polarized-component by the reflecting plane 52a must be set to 38.2%.

Figure 12:
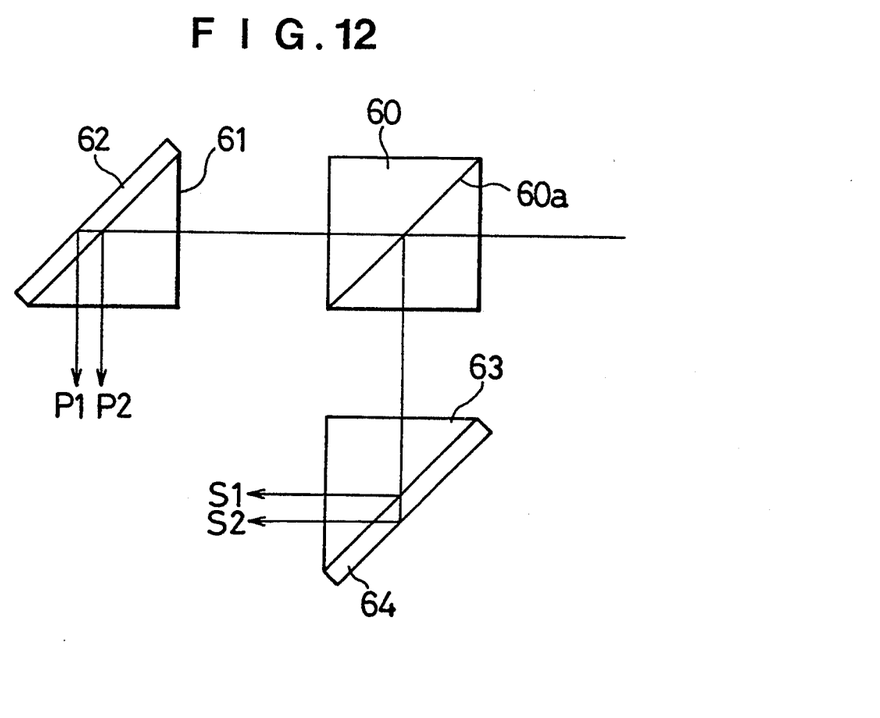
FIG. 12 is a plane view showing an example of a mechanism for splitting a laser beam.

FIG. 12 shows an optical mechanism provided in the optical system for splitting a beam. In the example shown in FIG. 12, after a beam is split into a P-polarized-component and an S-polarized-component by a polarized beam splitter 60, the P-polarized-component is split into two parallel beams P1 and P2 by a prism 61 and a parallel plane plate 62, and the S-polarized-component is split into two parallel beams S1 and S2 by a prism 63 and a parallel plane plate 64. To equalize the amount of the polarized beams P1 and P2, and to equalize the amount of the polarized beams S1 and S2, the reflectances of prisms 61 and 63 should be set to 38.2%.

In the mechanism shown in FIG. 12, the polarized beam splitter 60 has a first splitting function by which the reflected beam is split into a P-polarized-component and an S-polarized-component, and a second splitting function by which each of the P-polarized-component and the S-polarized-component are split into a first direction and a second direction, respectively. The parallel plane plates 62 and 64 have the splitting function in which the reflected beam is split by a small amount.

As shown in FIG. 12, to split a beam by a small amount, an angular difference therebetween is not necessary for the split beams. Therefore, in each of the embodiments described above, the parallel plane plate can be used instead of the wedge prism.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Applications Nos. 3-69595 (filed on Jan. 11, 1991) and 3-284703 (filed on Oct. 30, 1991) which are expressly incorporated herein by reference in their entirety.

We claim:

1. A signal sensing device for a magneto-optic disk device, comprising:
   means for splitting a beam reflected from a magneto-optic disk, said splitting means comprising a first splitting function by which the reflected beam is split into a P-polarized-component, comprising a beam having only P-polarized light, and an S-polarized-component, comprising a beam having only S-polarized light, and a second splitting function by which each of said P-polarized-component and said S-polarized-component are split into a first optical path and a second optical path, respectively;
   a first photo sensor comprising a beam receiving divided area and a beam receiving undivided area, said beam receiving divided area being arranged to receive one of the P-polarized-component and the S-polarized-component which is directed in said first optical path, to sense an error signal, and said beam receiving undivided area being arranged to receive the other of the P-polarized-component and the S-polarized-component which is directed in said first optical path; and
   a second photo sensor comprising a beam receiving undivided area provided for receiving one the P-polarized-component and the S-polarized-component which is directed in said second optical path.

2. A signal sensing device according to claim 1, wherein said second photo sensor is provided with a beam receiving divided area for receiving the other of the P-polarized-component and the S-polarized-component which is directed in said second optical path, to sense an error signal.

3. A signal sensing device according to claim 2, wherein said beam receiving divided area of said first photo sensor is provided for obtaining a focusing error signal, said beam receiving divided area of said second photo sensor is provided for obtaining a tracking error signal, and said beam receiving undivided areas of said first and second photo sensors are provided for obtaining an information record signal.

4. A signal sensing device according to claim 2, wherein said beam receiving divided areas of said first and second photo sensors are provided for obtaining a focusing error signal and a tracking error signal, and said beam receiving undivided areas of said first and second photo sensors are provided for obtaining an information record signal.

5. A signal sensing device according to claim 1, wherein said splitting means splits the reflected beam by a predetermined amount of angle.

6. A signal sensing device according to claim 1, wherein said splitting means splits the reflected beam to form parallel beams that are separated from each other by a predetermined amount.

7. A signal sensing device according to claim 1, wherein said splitting means is provided with a polarized light splitting prism which has said first splitting function.

8. A signal sensing device according to claim 1, wherein said splitting means is provided with a prism block having a half-mirror plane for providing said second splitting function.

9. A signal sensing device according to claim 8, further comprising a condenser lens through which is passed a laser beam that has passed through said prism block.

10. A signal sensing device according to claim 8, further comprising a condenser lens provided at a position at which a laser beam is not divided by said prism block.

11. A signal sensing device according to claim 1, wherein said splitting means is provided with a polarized light splitting prism of a crystalline polarizer for providing said first splitting function.

12. A signal sensing device according to claim 11, wherein said polarized light splitting prism is a Wollaston prism.

13. A signal sensing device according to claim 11, wherein said polarized light splitting prism is a Rochon prism.

14. A signal sensing device according to claim 11, wherein said polarized light splitting prism is a Senarmont prism.

15. A signal sensing device according to claim 11, wherein said polarized light splitting prism is a Gramthomson prism.

16. A signal sensing device according to claim 11, wherein said splitting means is provided with a total reflecting prism.

17. A signal sensing device according to claim 1, wherein said splitting means is provided with a polarized light splitting prism which includes a film disposed between a first prism and a second prism and comprising means for polarizing and splitting the beam, said first prism comprising a reflecting plane which is parallel to or inclined with a predetermined angle relative to said film.

18. A signal sensing device according to claim 1, wherein said beam receiving divided area of said first photo sensor is divided in a pattern for receiving error signals, and said beam receiving divided area of said second sensor is divided in a pattern substantially the same as said pattern in which said beam receiving divided area of said first photo sensor is divided.

19. A signal sensing device for a magneto-optic disk device, comprising:
   means for splitting a beam reflected from a magneto-optic disk into a P-polarized-component, comprising a beam having only P-polarized light, and an S-polarized-component, comprising a beam having only S-polarized light;
   means for splitting each of said P-polarized-component and said S-polarized-component into first and second P-polarized optical paths and first and second S-polarized optical paths respectively;
   a first photo sensor comprising a beam receiving divided area and a beam receiving undivided area, said beam receiving divided area being arranged to receive the P-polarized-component directed in said first P-polarized optical path to thereby sense an error signal, and said beam receiving undivided area being arranged to receive the S-polarized-component directed in said first S-polarized optical path; and a second photo sensor comprising a beam receiving undivided area being arranged to receive the P-polarized-component directed in said second P-polarized optical path.

20. A signal sensing device for a magneto-optic disk device, comprising:

means for splitting a laser beam reflected from a magneto-optic disk, said splitting means comprising a first splitting function by which the reflected beam is split into a P-polarized component, comprising a beam having only P-polarized light, and an S-polarized component, comprising a beam having only S-polarized light, and a second splitting function by which each of said P-polarized component and said S-polarized component are split by a predetermined amount into first and second P-Polarized components and first and second S-Polarized components, respectively;

a first photo sensor comprising a beam receiving divided area and a beam receiving undivided area, said beam receiving divided area being arranged to receive one of said first P-polarized component and said first S-polarized component, to sense an error signal, and said beam receiving undivided area being arranged to receive the other of said first P-polarized component and said first S-polarized component; and a second photo sensor comprising a beam receiving undivided area being arranged to receive one of said second P-polarized component and said second S-Polarized component.

21. A signal sensing device according to claim 1, wherein a splitting amount of said first splitting function is smaller than a splitting amount of said second splitting function.

22. A signal sensing device according to claim 19, wherein a splitting amount of said first splitting function is smaller than a splitting amount of said second splitting function.

* * * * *

UNITED STATES PATENT AND TRADEMARK OFFICE
CERTIFICATE OF CORRECTION

PATENT NO.    : 5,337,300
DATED         : August 9, 1994
INVENTOR(S)   : S. TAKISHIMA et al.

It is certified that error appears in the above-indentified patent and that said Letters Patent is hereby corrected as shown below:

At the cover page , section [54] of the printed patent, lines 3 and 4 under title, "SIGNAL AND INFORMATION RECORD SIGNALS" should be changed to ---SIGNALS AND INFORMATION RECORD SIGNAL---. This appeared correctly on page 1, line 24 of the amendment as filed on March 5, 1993.
    Therefore, it is respectfully requested that a Certificate of Correction issue in the above-identified patent as follows:
    At the cover page , section [54], lines 3 and 4 under title, change "SIGNAL AND INFORMATION RECORD SIGNALS" to ---SIGNALS AND INFORMATION RECORD SIGNAL---.

Signed and Sealed this

Eighteenth Day of April, 1995

Attest:

BRUCE LEHMAN

*Attesting Officer*                *Commissioner of Patents and Trademarks*